United States Patent
Boivie et al.

(10) Patent No.: US 9,516,021 B2
(45) Date of Patent: *Dec. 6, 2016

(54) SECURE MANAGEMENT OF A SMART CARD

(71) Applicant: INTERNATIONAL BUSINESS MACHINES CORPORATION, Armonk, NY (US)

(72) Inventors: Richard H. Boivie, Monroe, CT (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,485

(22) Filed: Nov. 19, 2015

(65) Prior Publication Data
US 2016/0080370 A1     Mar. 17, 2016

Related U.S. Application Data

(63) Continuation of application No. 14/249,001, filed on Apr. 9, 2014, now Pat. No. 9,251,330.

(51) Int. Cl.
*G06F 12/00* (2006.01)
*G11C 7/00* (2006.01)
(Continued)

(52) U.S. Cl.
CPC ........... *H04L 63/0853* (2013.01); *G06F 21/32* (2013.01); *G06F 21/34* (2013.01);
(Continued)

(58) Field of Classification Search
CPC ........... H04L 63/1416; H04L 63/1408; H04L 63/1441; H04L 63/1458
USPC .............................. 726/19; 713/189; 380/200
See application file for complete search history.

(56) References Cited

U.S. PATENT DOCUMENTS

| | | |
|---|---|---|
| 6,000,016 A | 12/1999 | Curtis et al. |
| 7,413,113 B1 | 8/2008 | Zhu |

(Continued)

FOREIGN PATENT DOCUMENTS

| | | |
|---|---|---|
| WO | 02091311 A1 | 11/2002 |
| WO | 2009001394 A1 | 12/2008 |

(Continued)

OTHER PUBLICATIONS

J. Markoff, "Killing the Computer to Save It", The New York Times, www.nytimes.com, Oct. 29, 2012, pp. 1-6.

(Continued)

*Primary Examiner* — Evans Desrosiers
(74) *Attorney, Agent, or Firm* — Law Office of Jim Boice (57) ABSTRACT

A smart card includes a processing circuit, a memory that contains a protected object, an activity detector that receives a signal that describes a planned activity of a person who is in physical possession of the smart card, and an activity analyzer that evaluates features of the planned activity. In response to the activity analyzer determining that a predefined risk associated with the planned activity exceeds a predetermined value, the activity analyzer issues an instruction to a user to provide a biomarker to a biosensor. A blending logic blends real-time biometric data with a security object to generate a hybrid security object. A conversion logic uses the hybrid security object to convert a protected object into a usable object that can be utilized by the processing circuit within the smart card. A matrix barcode generator generates a matrix barcode that contains information about the user of the smart card.

1 Claim, 6 Drawing Sheets

(51) Int. Cl.
*H04L 29/06* (2006.01)
*G06F 21/32* (2013.01)
*G06K 19/06* (2006.01)
*G06F 21/62* (2013.01)
*G06F 21/34* (2013.01)
*G06F 15/16* (2006.01)
*G06F 12/14* (2006.01)

(52) U.S. Cl.
CPC ..... *G06F21/6218* (2013.01); *G06K 19/06037* (2013.01); *G06K 19/06112* (2013.01); *H04L 63/0861* (2013.01); *G06F 2221/2111* (2013.01)

(56) References Cited

U.S. PATENT DOCUMENTS

| | | | |
|---|---|---|---|
| 7,920,851 | B2 | 4/2011 | Moshir et al. |
| 8,002,175 | B2* | 8/2011 | Kuriyama ............ G06K 7/1095 235/379 |
| 8,360,322 | B2* | 1/2013 | Bonalle ................ G06Q 20/105 235/379 |
| 8,485,440 | B1 | 7/2013 | Arora et al. |
| 8,578,175 | B2 | 11/2013 | Boivie et al. |
| 8,600,883 | B2 | 12/2013 | Wong |
| 2003/0084346 | A1 | 5/2003 | Kozuch et al. |
| 2004/0039926 | A1 | 2/2004 | Lambert |
| 2004/0215876 | A1 | 10/2004 | Roberti |
| 2005/0076226 | A1 | 4/2005 | Boivie et al. |
| 2007/0047735 | A1 | 3/2007 | Celli et al. |
| 2008/0223937 | A1* | 9/2008 | Preta ...................... G06F 21/32 235/492 |
| 2010/0125509 | A1 | 5/2010 | Kranzley et al. |
| 2010/0279610 | A1 | 11/2010 | Bjorhn et al. |
| 2010/0332843 | A1 | 12/2010 | Boivie et al. |
| 2010/0332850 | A1 | 12/2010 | Boivie et al. |
| 2011/0191244 | A1 | 8/2011 | Dai |
| 2012/0006891 | A1 | 1/2012 | Zhou et al. |
| 2012/0158581 | A1 | 6/2012 | Cooley et al. |
| 2012/0216051 | A1 | 8/2012 | Boivie et al. |
| 2013/0061058 | A1 | 3/2013 | Boivie et al. |
| 2013/0097034 | A1 | 4/2013 | Royyuru et al. |

FOREIGN PATENT DOCUMENTS

| | | |
|---|---|---|
| WO | 2012111019 A1 | 8/2012 |
| WO | 2013177500 A1 | 11/2013 |

OTHER PUBLICATIONS

Arm Limited, "Arm Security Technology: Building a Secure System Using Trustzone Technology", Arm Limited, Apr. 2009, pp. 1-108.

International Searching Authority, Written Opinion for PCT/CA20141/050685, mailed Oct. 23, 2014.

Pirker, M. et al., "A Framework for Privacy-Preserving Mobile Payment on Security Enhanced ARM TrustZone Platforms", Proceedings of 2012 IEEE 11th International Conference on Trust, Security and Privacy in Computing and Communications, Jun. 2012, pp. 1155-1160. (Abstract Only).

Gao, J. et al., "A 2D Barcode-Based Mobile Payment System", Proceedings of the Third International Conference on Multimedia and Ubiquitous Engineering, Jun. 2009, pp. 320-329. (Abstract Only).

* cited by examiner

SECURE MANAGEMENT OF A SMART CARD

BACKGROUND

The present disclosure relates to the field of smart cards, and specifically to smart cards that are configurable. Still more particularly, the present disclosure relates to protecting and securing configurable smart cards.

Cyber security is an increasing problem. As credit cards, identification cards, access cards, etc. provide more and more secure information, there is an increasing need to protect such information from nefarious parties.

SUMMARY

In an embodiment of the present invention, a smart card includes: a processing circuit; a memory, where the memory contains a protected object, and where the protected object initially cannot be utilized in its protected state by the processing circuit within the smart card; an activity detector, where the activity detector receives a signal that describes a planned activity of a person who is in physical possession of the smart card; an activity analyzer, where the activity analyzer evaluates features of the planned activity, and where, in response to the activity analyzer determining that a predefined risk associated with the planned activity exceeds a predetermined value, the activity analyzer: issues an instruction to the person who is in physical possession of the smart card to provide a biomarker to a biosensor that is physically contained within the smart card; and receives, from the biosensor, real-time biometric data for the person who is in physical possession of the smart card; a receiving device, where the receiving device receives a security object; a blending logic, where the blending logic combines the real-time biometric data with the security object to generate a hybrid security object; a conversion logic, where the conversion logic uses the hybrid security object to convert the received protected object into a usable object that can be utilized by the processing circuit within the smart card; a matrix barcode generator, where the matrix barcode generator generates a matrix barcode that contains payment information for the person who is in physical possession of the smart card; and a display, where the display displays the matrix barcode on the smart card, where the smart card functions as a payment card.

In an embodiment of the present invention, a smart card includes: a processing circuit; a memory, where the memory contains a protected object, where the protected object initially cannot be utilized in its protected state by the processing circuit within the smart card; an activity detector, where the activity detector receives a signal that describes a planned activity of a person who is in physical possession of the smart card; an activity analyzer, where the activity analyzer evaluates features of the planned activity, and where, in response to the activity analyzer determining that a predefined risk associated with the planned activity exceeds a predetermined value, the activity analyzer: issues an instruction to the person who is in physical possession of the smart card to provide a biomarker to a biosensor that is physically contained within the smart card; and receives, from the biosensor, real-time biometric data for the person who is in physical possession of the smart card; a receiving device, where the receiving device receives a security object; a blending logic, where the blending logic combines the real-time biometric data with the security object to generate a hybrid security object; a conversion logic, where the conversion logic uses the hybrid security object to convert the received protected object into a usable object that can be utilized by the processing circuit within the smart card; a matrix barcode generator, where the matrix barcode generator generates a matrix barcode that contains identification information for the person who is in physical possession of the smart card; and a display, where the display displays the matrix barcode on the smart card, where the smart card functions as an identification card.

In an embodiment of the present invention, a smart card includes: a processing circuit; a memory, where the memory contains a protected object, where the protected object initially cannot be utilized in its protected state by the processing circuit within the smart card; an activity detector, where the activity detector receives a signal that describes a planned activity of a person who is in physical possession of the smart card; an activity analyzer, where the activity analyzer evaluates features of the planned activity, and where, in response to the activity analyzer determining that a predefined risk associated with the planned activity exceeds a predetermined value, the activity analyzer: issues an instruction to the person who is in physical possession of the smart card to provide a biomarker to a biosensor that is physically contained within the smart card; and receives, from the biosensor, real-time biometric data for the person who is in physical possession of the smart card; a receiving device, where the receiving device receives a security object; a blending logic, where the blending logic combines the real-time biometric data with the security object to generate a hybrid security object; a conversion logic, where the conversion logic uses the hybrid security object to convert the received protected object into a usable object that can be utilized by the processing circuit within the smart card; a matrix barcode generator, where the matrix barcode generator generates a matrix barcode that contains access authorization information for the person who is in physical possession of the smart card; and a display, where the display displays the matrix barcode on the smart card, where the smart card functions as a premises access card.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
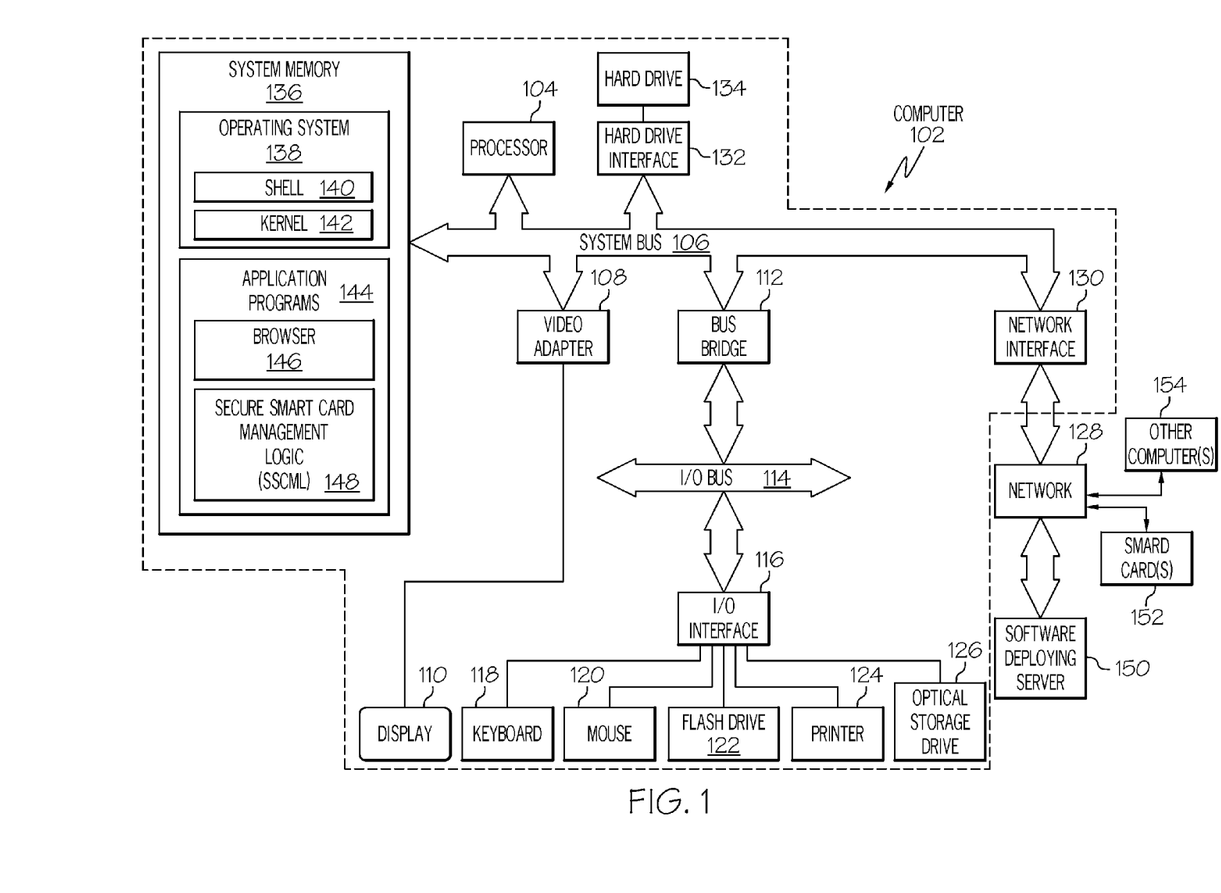
FIG. 1 depicts an exemplary computer network which may be utilized by the present invention.

With reference now to the figures, and particularly to FIG. 1, there is depicted a block diagram of an exemplary computer 102, which the present invention may utilize. Note that some or all of the exemplary architecture shown for computer 102 may be utilized by software deploying server 150, other computer(s) 154, and/or smart card (s) 152.

Computer 102 includes a processor 104. Processor 104 is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and an optical storage device 126 (e.g., a CD or DVD drive). The format of the ports connected to I/O interface 116 may be any known to those skilled in the art of computer architecture, including but not limited to Universal Serial Bus (USB) ports.

Computer 102 is able to communicate with a software deploying server 150, other computer(s) 154, and/or smart card(s) 152 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Secure Smart Card Management Logic (SSCML) 148. SSCML 148 includes code for implementing the processes described below in FIGS. 2-4 and 6.

In one embodiment, computer 102 is able to download SSCML 148 from software deploying server 150, including in an on-demand basis. Note further that, in one embodiment of the present invention, software deploying server 150 performs all of the functions associated with the present invention (including execution of SSCML 148), thus freeing computer 102 from having to use its own internal computing resources to execute SSCML 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
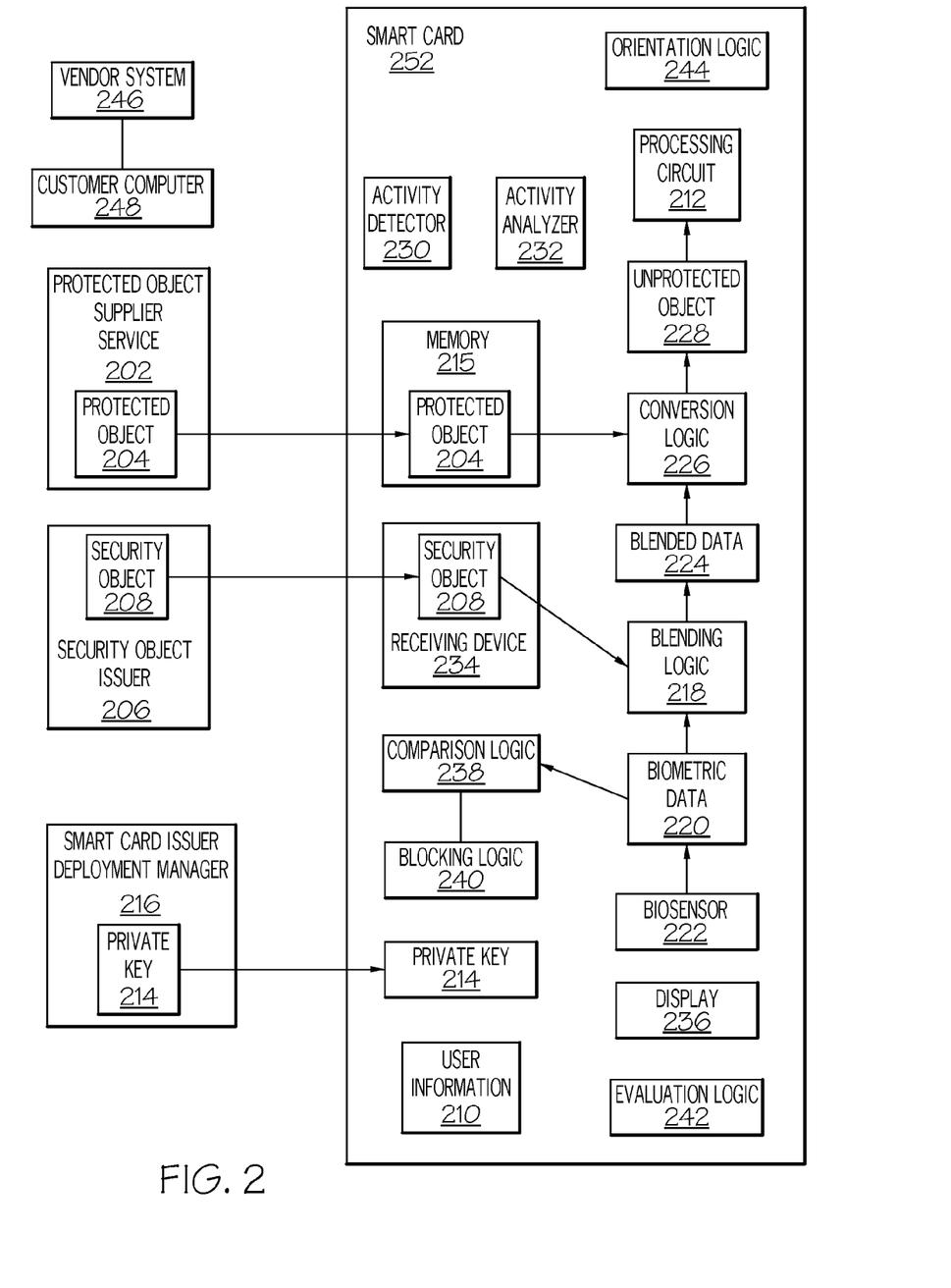
FIG. 2 illustrates a novel smart card as according in one or more embodiments of the present invention.

With reference now to FIG. 2, an exemplary smart card 252, which may be one of the smart card(s) 152 depicted in FIG. 1, is depicted. By being selectively configured (e.g., through the use/execution of an object such as unprotected object 228), smart card 252 is able to perform the function of one or more traditional cards. For example, in various embodiments smart card 252 has the functionality of a credit/debit card, identification card, building access card, a gift card, etc., either at the same time or at different times. Such physical cards typically have information related to the card and/or a holder of the card, such as account numbers associated with the card, a monetary value of the card, identity information about the holder of the card, etc., encoded on a magnetic strip or within a non-volatile electronic memory. When swiped across a slotted reader or other card reading device, the card thus provides sufficient information to 1) access a server that contains account/identification/authorization information about the card and/or its user, and/or 2) directly provide such account/identification/authorization information about/for the card/user to the reader.

As shown in FIG. 2, a protected object supplier service 202, which may utilize computer 102 and/or one or more of the other computers 154 depicted in FIG. 1, is coupled to smart card 252 (e.g., via a network such as network 128 shown in FIG. 1). The protected object supplier service 202 creates, contains, and/or supplies a protected object 204.

Protected object 204 is an object that is needed by smart card 252 to provide a particular predefined functionality to smart card 252. For example, if smart card 252 contains sufficient processing power to support an operating system, a compiler, etc., then protected object 204 may be a software application that allows the smart card 252 to process transaction data, provide a user with access to a building by activating a "smart" physical door lock, etc. If smart card 252 contains a more rudimentary level of processing power that can still execute precompiled machine code (e.g., microcode), then protected object 204 is such microcode. Execution of such microcode also allows the smart card 252 to process transactions, open a smart physical door lock, etc., depending on what the microcode (protected object 204) is.

In one embodiment, protected object 204 is not executable code, but rather is a simple input signal. For example, protected object 204 may be signals that are sent, via hardwires, to one or more pins in an Integrated Circuit (IC) package (e.g., processing circuit 212), thus enabling/disabling certain functions of the IC within that IC package. Again, the functions of such an IC may be to process transactions, open a physical door lock, etc., depending on the protected object 204 (and thus the unprotected object 228), as well as the configuration of the entity to which the smart card 252 is coupled/read (e.g., a point-of-sale terminal, a building access pad, etc.).

In one or more embodiments of the present invention, note that the protected object 204 is "protected". The term "protected" is defined as being unusable by smart card 252 in its present state. For example, the protected object 204 may be encrypted by hashing or otherwise rearranging the digital data that represents machine-executable code. In an embodiment in which the protected object 204 is merely one or more voltage levels being supplied to IC package pin(s), then the protected object 204 may have these voltage levels moved higher/lower, such that the voltage levels no longer represent their original information/instructions to the IC package pin(s).

Also coupled to the smart card 252, via a network such as network 128 shown in FIG. 1, is a security object issuer 206, which may utilize the computer 102 and/or one or more of the other computer(s) 154 depicted in FIG. 1. Within security object issuer 206 is a security object 208. Security object 208 is code/microcode/signals that are required to convert the protected object 204 into a form that can be utilized by the smart card 252. As described herein in one or more embodiments of the present invention, however, the security object 208 alone is not enough to convert the protected object into a usable form. Rather, biometric data 220 (i.e., one or more biomarkers that are unique to a particular person, such as that person's thumbprint, photo, etc.) will also be needed to convert the protected object 204 into an unprotected object 228, as discussed herein. In one embodiment, security object 208 is compilable and/or executable software code that performs processes described herein to enable the use of a protected object 204. In another embodiment, security object 208 is a credential, token, key, or other object that is used to afford access to a protected area of memory in which the protected object 204 is stored, as also described herein.

In one embodiment, each security object 208, which is created by security object issuer 206, is specific for a particular application (e.g., protected object 204). That is, a first security object may be designed to enable decryption of a first protected object (if that protected object is an application); a second security object may be designed to enable decryption of a second protected object (again assuming that this second protected object is an application); a third security object may be designed to enable changing the voltage levels of inputs to IC pins (if the protected object is a set of IC pin voltage inputs); etc. This allows a fine level of granularity for controlling which protected objects (i.e., protected object 204) can be decrypted/enabled, as described in further detail below.

Continuing with FIG. 2, assume that smart card 252 must be able to utilize an unprotected version of protected object 204, in order to provide a specific function. For example, assume that smart card 252 is a financial transaction card (e.g., a credit card, a debit card, etc.), and that smart card 252 is designed to allow a holder to swipe the card through a card reader, in order to read information about the card holder (i.e., his/her bank account number, store account number, amount of credit left on a prepaid smart card, etc.), thus allowing a purchase transaction to be completed. In a simple example, this information would be read from the user information 210, which may be stored on a magnetic strip, a near-field-communication (NFC) identification chip (e.g., an Radio Frequency Identifier—RFID), etc. However, this embodiment would be easy to hack, such as by a false reader (e.g., a "Trojan horse" reader that looks like an ATM machine, but is actually just an unauthorized information reader). Similarly, the user information could be the card's account number that is simply printed on the front of the card (along with a security pin number). Again, this is easy to hack by simply looking over the user's shoulder (either in person or with the use of surreptitious overhead cameras). The present invention overcomes this security exposure.

Referring still to FIG. 2, assume that a processing circuit 212 is used to provide the smart card 252 with one or more functions (e.g., those of a credit card, debit card, identification card, building access card, operation authorization card, etc.). For example and in one embodiment of the present invention, the output of the processing circuit 212 will enable user information 210 to be released to an NFC transmitter (assuming that user information 210 is otherwise inaccessible to any entity outside of the smart card 252) or other input/output (I/O) devices (not depicted). This release of the user information 210 can then be used by a card reader to allow the card holder to complete a purchase, enter a building/room, perform a restricted operation (e.g., perform a regulated/restricted operation on equipment), etc. That is, in one embodiment of the present invention the output from the processing circuit 212 is not the user information 210 itself, but rather is a requisite signal needed to access the user information 210. For example, user information 210 may be stored in a protected area (not expressly shown) of memory 215. In order to access this protected area of memory, a "key" (e.g., a set of bits in a predetermined order) must be provided to a memory controller (not depicted) before the user information 210 can be accessed.

In one embodiment of the present invention, just the security object 208 is needed to convert the protected object 204 into a usable condition/format. For example, if protected object 204 is protected by being encrypted, then security object 208 may simply be a decryption key (e.g., a private key such as private key 214) needed to decrypt the encrypted protected object 204. As depicted in FIG. 2, in one embodiment a smart card issuer deployment manager 216 creates, store, and deploys the private key 214. This allows the smart card issuer deployment manager 216 to control the use of the protected object 204 at a high level of granularity. For example, assume that the private key 214 is specific for use in decrypting security object 208 and/or protected object 204. Thus, private key 214 is only able to enable functionality of smart card 252 that is associated with protected object 204. However, assume now the protected object 204 is needed to make the smart card function as a credit card for a first account, and that another protected object (not depicted but analogous in function to the depicted protected object 204) and/or security object (also not depicted but analogous in function to the depicted security object 208) are used to enable the smart card 252 with another functionality (e.g., to work as a credit card for a second account, to provide access to a building, etc.) than the functionality afforded by the depicted protected object 204. Thus, different private keys are able to control different protected objects, and therefore real-time functionalities of the smart card 252.

In order to allow control of the functionality of the smart card 252 to be variable in real time, in one embodiment smart card 252 is prohibited from permanently storing a copy of private key 214, thus making the smart card 252 dependent upon the smart card issuer deployment manager 216 for its ability to provide various functionalities. This permanent storage prohibition may be accomplished by attaching a header to a packet that delivers the private key 214 from the smart card issuer deployment manager 216, where the header contains an instruction that causes the private key 214 to be automatically deleted from the smart card 252 after a predetermined length of time. Thus, without the private key 214 and/or security object 208, the processing circuit 212 is unable to enable a certain functionality to smart card 252. This enables the smart card issuer deployment manager 216 to selectively enable various protected objects that depend on the private key/security object in real time or near-real time. For example, assume that a first protected object is used to enable the smart card 252 to function as a building access card. Assume further that the first protected object requires a first security object and/or a first public key to execute that first protected object. Assume further that a second protected object is used to enable the smart card 252 to function as an identification card, and that the second protected object requires a second security object and/or a second private key to utilize that second protected object. By "blanking" (i.e., erasing from memory) only the first security object and/or first private key, the smart can still function as an identification card, but can no longer function as a building access card. This allows the smart card issuer deployment manager 216 to selectively control which functions of the smart card 252 are active/valid at any time.

While simple use of the private key 214 to decrypt the security object 208 in order to convert the protected object 204 into a usable state is fast, it is not particularly secure, since invasive searches can obtain the private key 214, thus making the entire system unsecure. However, one embodiment of the present invention provides a system that is far more secure and unbreakable in protecting the assets (e.g., user information 210) and functionality (e.g., building access) of the smart card 252. This system utilizes a blending logic 218, which in a preferred embodiment is a Field Programmable Gate Array (FPGA), although in an alternate embodiment may be any other type of hardware circuit or executable software with a processor unit.

As depicted in FIG. 2, blending logic 218 receives both the security object 208 (which was received from the security object issuer 206 by hardware such as a receiving device 234) as well as a biometric data 220 from a biosensor 222, to create blended data 224, which is processed by conversion logic 226 to convert the protected object 204 into an unprotected object 228, which is now in a format/state that is usable by the processing circuit 212. For example, consider the following scenario/use case.

Assume that a user is attempting to use smart card 252 as a credit card to make a purchase in a store. This use poses two risks: 1) theft of information from the credit card, and 2) unauthorized use of the credit card by an unauthorized holder. The use of blending logic 218 reduces, if not eliminates, both of these risks.

Blending logic 218 utilizes an algorithm known only to blending logic 218 and/or conversion logic 226. This algorithm combines, in a secure manner (i.e., according to the private algorithm known to blending logic 218), the security object 208 with a biometric data 220. Examples of a biometric data 220 include, but are not limited to, a fingerprint, an eye scan, a photograph, or any other measurement of a physiological feature of a person who is in possession of the smart card 252. For example, biosensor 222 may be a simple camera, which can capture the facial features of the card holder. Similarly, biosensor 222 may be a touch sensitive screen that is able to detect the ridges of the card holder's fingerprint/thumbprint. By taking a photo of the user, or measuring his/her fingerprint, retinal pattern, etc., digital biometric data 220 for a particular person is thus generated. The security object 208 is then combined with the biometric data 220 to create a blended data 224, which is unique for 1) the security object and 2) the holder of the smart card 252.

Blended data 226 now functions as a "ultra-private" key that is used by conversion logic 226 to convert protected object 204 into the unprotected object 228. The unprotected object 228 may be a software program, a set of microcode/machine code, a voltage converter, a timing delay, or any other software or hardware object that enables processing circuit 212 to operate in a manner that enables smart card 252 to perform a particular function.

For example, assume that processing circuit 212 has the ability to execute software code. Unprotected object 228 may be software that, when executed by processing circuit 212 (e.g., a microprocessor), selectively allows smart card 252 to function as a credit card, a debit card, a building access card, an operation authorization card, or some other type of card. That is, in one embodiment the execution of this software code gives the smart card 252 one particular functionality. In order to have another functionality, then another unprotected object must be executed. Thus, one unprotected object 228 may give the smart card 252 the ability to act as a credit card, while another unprotected object 228 may give the smart card 252 the ability to act as a building access card.

In another embodiment, however, the processing circuit 212 is more rudimentary than a code executing system. For example, processing circuit 212 may be an audio annunciator (sound generator, including a speaker) that emits a particular sound for a specific purpose. For example, assume that smart card 252 is a building access key card that operates with a sound-activated access panel. In order to enter the building, the sound-activated access panel must receive a certain frequency of sound (subsonic, sonic, and/or ultrasonic), perhaps at a certain decibel level, in order to unlock a door to a building/room. The only way this audio annunciator is able to produce this specific sound is through the use of the unprotected object 228, which may be a control signal to the audio annunciator (i.e., processing circuit 212).

Note that in one embodiment, the unprotected object 228 is created with the use of 1) the protected object 204, 2) the security object 208, and 3) the biometric data 220, which includes the use of the blending logic 218, as described above. In an alternative embodiment, however, the blending logic 218 is skipped, such that the biometric data 220 alone is used by the conversion logic 226 to convert the protected object 204 into the unprotected object 228.

Note further that while the process described above uses the blending logic 218 to provide an additional layer of protections to the security object 208, in an alternatively embodiment the blending logic 218 receives the protected object 204 while the conversion logic 226 receives the security object 208. This allows the protected object 204 to become the blended data 224 with the biometric data 220, thus giving more protection to the protected object 204, rather than the security object 208.

In one embodiment, the protected object 204 can be directly converted by the conversion logic 226 into the unprotected object 228 by using the security object 208 directly, instead of the blended data 224 as described above. The decision to utilize the biosensor 222 and blending logic 218 may be prompted by real-time circumstances, which are identified by an activity detector 230 and an activity analyzer 232. The activity detector 230 is hardware that receives a signal that describes present circumstances, including what activities are being attempted by the holder of the smart card 252, and the activity analyzer 232 is software/firmware or specially designed hardware that analyzes the signal received by the activity detector 230 to determine whether or not the biometric data 220, security object 208, and/or private key 214 are needed to convert the protected object 204 into the unprotected object 228.

For example, assume that activity detector 230 detects that the smart card 252 has been swiped through a Point Of Sale (POS) card reader, indicating that the holder of the smart card 252 is attempting to make a purchase. However, the activity detector 230 detects an anomaly regarding the attempted transaction. For example, the POS card reader may be in a city/country that is far from where the holder of the smart card 252 resides, as determined by the activity analyzer 232. Or the activity detector 230 may detect that the purchase is for an expensive piece of jewelry, which the activity analyzer 232 determines is a type of purchase that has never been made by the holder of the smart card 252. Or the activity detector 230 may detect, from an on-board time clock or a reading from a card swiping machine, that the smart card 252 is being used at 3:00 AM, which the activity analyzer 232 determines is a time of day that the smart card 252 has never been used before. Detecting and analyzing of any type of anomaly, including those just mentioned, will prompt the smart card 252 (e.g., the activity analyzer) to initiate additional security measures. For example, detection of the transaction anomaly may cause a message to be displayed on a display 236 of the smart card, directing the user to take his picture, swipe his fingerprint, etc. with the biosensor 222 on the smart card 252. If the biometric data 220 ultimately causes the unprotected object 228 to be generated by the conversion logic 226 (i.e., the biomarkers match those of the authorized card holder), then the purchase is allowed to proceed by the processing circuit 212 becoming active (i.e., providing the functionality of a credit card). However, if an unauthorized user is holding the smart card 252, then the biometric data 220 will be faulty, and the requisite unprotected object 228 will not be generated, thus preventing the smart card 252 from functioning as a credit card.

In another example, assume that activity detector 230 is a Global Positioning System (GPS) detector. In this example, the GPS system (or a similar location detecting system, such as a signal triangulating system within a building/room that provides exact real-time location information) will receive real-time signals indicating the current location of the smart card 252. Assume that the holder of the smart card 252 wants to use the smart card 252 as an authorization card to override a safety system (e.g., a power lockout to a machine). Thus, processing circuit 212 may provide information (e.g., from the user information 210) needed to perform such an operation. If the person is next to the machine whose power lockout is to be overridden, then the person will know that the power will be coming back on to the machine, since he/she is the one giving the order. Thus, there are no surprises to that person when the power to the machine comes back on. However, if the person holding the smart card 252 and attempting to power up the machine is at a control panel that is in another building (e.g., several hundred feet or miles from the machine being powered back up), then overriding the power lockout could be hazardous to an unsuspecting person who is working on or next to that machine. Therefore, the activity detector 230 identifies the location of the person who is in possession of the smart card 252 as being unsafe. If the person had been standing next to the machine, then the unprotected object 228 would have allowed the smart card 252 to be used to override the power lockout to the machine. That is, the activity analyzer 232 evaluates 1) the current location of the smart card 252 and 2) the functionality being provided by the unprotected object 228 when input to the processing circuit 212. But by determining that the smart card 252 is not near the machine being powered back up, the activity analyzer 232 will prevent the processing circuit 212 from executing, either by disabling the processing circuit 212, or by disabling the conversion logic 226 and/or the blending logic 218 and/or the biosensor 222.

Figure 3:
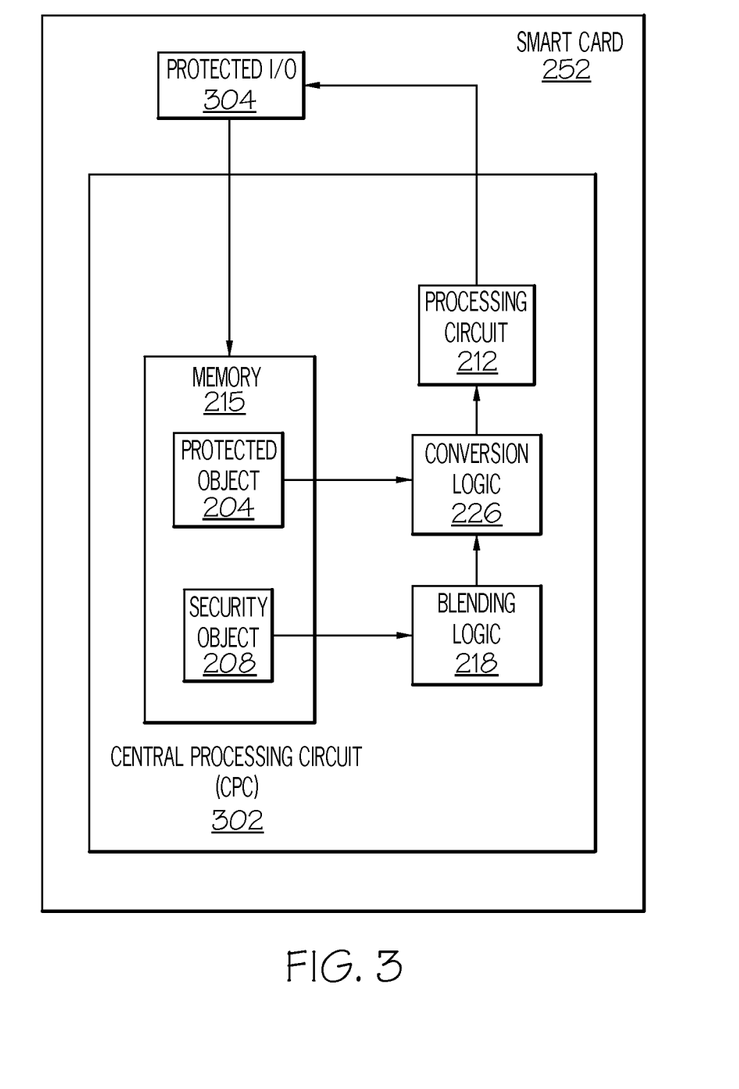
FIG. 3 depicts additional detail of an internal circuitry of the novel smart card depicted in FIG. 2.

In order to provide additional security to the system described herein, in one embodiment the memory 215, processing circuit 212, conversion logic 226, and blending logic 224 shown in FIG. 2 are part of a secure Central Processing Circuit (CPC) 302, as depicted in FIG. 3. As shown in FIG. 3, a protected I/O 304 controls what information can enter and leave the CPC 302. For example, protected object 204 and security object 208 can enter CPC 302, but cannot leave (i.e., they can be written to memory 215 by an outside source but cannot be read from memory 215 by an outside source). Likewise, the only output from processing circuit 212 coming directly from processing circuit 212 (i.e., via a hardwire or firewall), but not the protected object 204 and/or security object 208, can exit the smart card 252 via the protected I/O 304.

In one embodiment, the protected object 204 and/or security object 208 are further protected by being within a protected zone of memory 215. For example, security object 208 may contains a security algorithm/key/password, which is required by a memory manager (not shown) to allow a memory controller (also not shown) to access the protected zone of memory 215. Note that the projected object 204 and/or security object 208 may still be encrypted, even when stored in a protected zone of memory 215.

As described herein, in one embodiment of the present invention the smart card 252 is a transaction payment card (i.e., a credit card, debit card, etc.). In this embodiment, the smart card 252 may display (e.g., on the display 236 shown in FIG. 2) a matrix barcode that contains payment information for a user/holder of the smart card 252. In another embodiment, the smart card 252 generates a radio frequency signal, such as those used by a secure wireless communication (e.g., a near-field communication used with smart-card standard protocols), to generate payment information/authorization. In another embodiment, the smart card 252 functions as an identification (ID) card. In this embodiment, ID information for the holder/user of the smart card 252 is presented on the display (e.g., as a matrix barcode that contains identification information for a user), or as a radio frequency signal that supplies identity information/authorization. In another embodiment, the smart card 252 functions as a premises access card (i.e., a card that, when swiped, opens a locked door, notifies a security station, etc.). In this embodiment, the ID information is presented as a matrix barcode that contains access authorization information for the holder/user of the smart card 252 on the display, or as a radio frequency signal that supplies identity information/authorization.

Returning to FIG. 2, note that in one embodiment, a comparison logic 238 reads the biometric data 220 (which in one embodiment is prompted by activity analyzer 232, and in another embodiment occurs whenever an attempt to use the smart card 252 occurs) and compares the biometric data 220 with stored/trusted/known biomarker readings for the holder of the smart card 252. If there is not a match, then the blocking logic 240 prevents the processing circuit 212 from outputting a signal that enables the smart card 252 to perform a particular function. If there is a match, then the smart card 252 is allowed to function as desired by the user/holder.

In one embodiment of the present invention, the biosensor 222 is a camera, and the biomarker (e.g., biometric data 220) is a digital photograph of the person who is in physical possession of the smart card. In this embodiment, the smart card 252 further comprises a photo memory (e.g., part of or accessible to the comparison logic 238), where the photo memory holds a previous digital photograph of the person who is authorized to be in physical possession of the smart card, where the previous digital photograph was taken before the biomarker was taken. The comparison logic 238 compares the previous digital photograph and the biomarker. The blocking logic 240 thus prevents the conversion logic 226 from creating an executable application (e.g., unprotected object 228) in response to the previous digital photograph failing to match the biomarker/photo.

In one embodiment of the present invention, a planned activity for which the smart card 252 will be used is a planned financial transaction. In this embodiment the smart card 252 further comprises a physical positioning logic (e.g., a GPS system that is part of activity detector 230) that identifies a physical location of the smart card 252 in real-time. A financial transaction logic (i.e., evaluation logic 242) evaluates details of a proposed transaction (i.e., what is being purchased, the cost of the product, etc.). The financial transaction logic combines this information with other analyses provided by the activity analyzer 232 (i.e., where the purchase is taking place, etc.) to determine whether or not a predefined risk associated with the planned activity exceeds a predetermined value, particularly in response to the physical positioning logic within the activity detector 230 determining that the smart card 252 is at a physical location that has been predetermined to be incongruous with the planned financial transaction. If so, then the transaction will be blocked, either by sending a signal as such to a POS card swiper, or by disabling the output/function of the processing circuit 212.

In one embodiment of the present invention, the person who is in physical possession of the smart card is a particular worker, wherein the planned activity is an equipment maintenance operation. In this embodiment, the smart card 252 further comprises a worker evaluation logic (i.e., evaluation logic 242). This worker evaluation logic identifies an activity that has been preauthorized to be performed by the particular worker, such as adjusting critical components of a machine (e.g., issuing a command to a control panel to pull control rods in a nuclear reactor). An activity approval logic (also part of evaluation logic 242) determine whether or not this particular person is authorized to perform this particular operation. If not, then the activity approval logic blocks the smart card 252 from presenting requisite information (e.g., information in a matrix bar code) needed to perform this operation. In one embodiment, this blockage is accomplished by preventing conversion logic 226 from creating the hybrid security object (i.e., blended data 224) in response to the equipment maintenance/operation failing to match the activity that has been preauthorized to be performed by the particular worker. In another embodiment, the blockage is accomplished by simply disabling the processing circuit 212.

In one embodiment of the present invention, the receiving device 234 in FIG. 2 includes a rescission command logic (not shown). This rescission command logic, in response to the smart card 252 receiving a rescission command from the security object issuer 206, executes the rescission command to deactivate the security object 208. This deactivation of the security object 208 prevents future executions/conversions of the protected object 204, thus providing additional control over the functionality of the smart card 252.

In one embodiment of the present invention, the protected object 204 is stored in a protected region of memory 215 within the smart card 252. In this embodiment, the hybrid security object (i.e., blended data 224) provides access to this protected region of the memory 215 within the smart card 252. A memory access logic (not shown) then utilizes that hybrid security object to access the protected object within the protected region of the memory 215 within the smart card 252.

Figure 4:
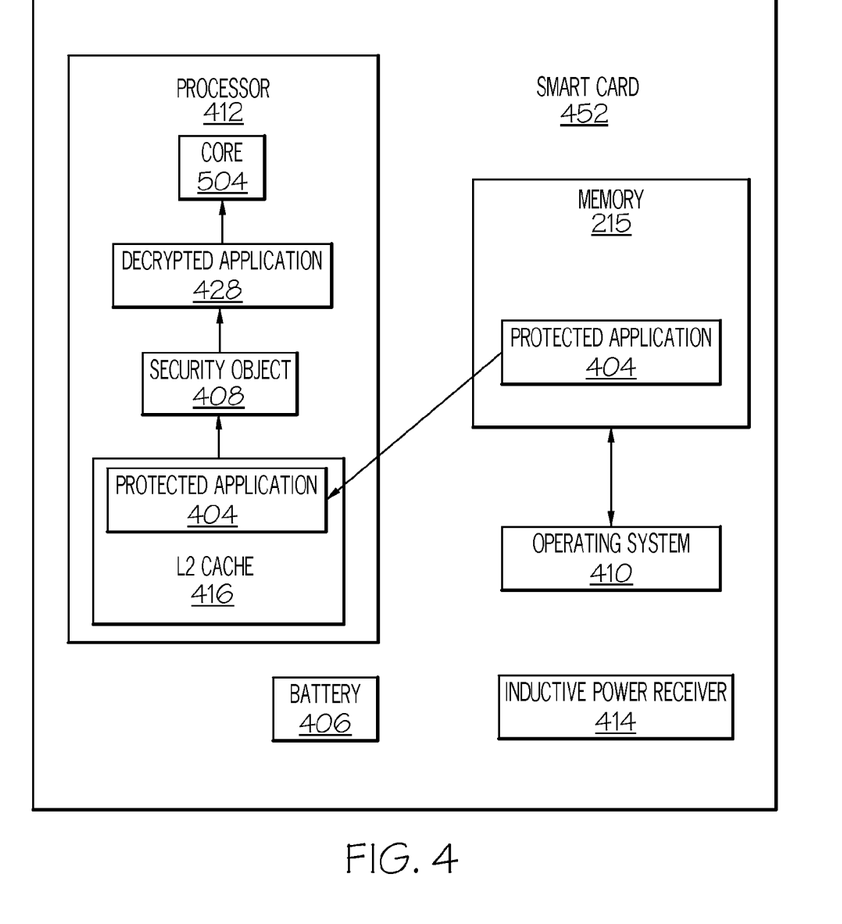
FIG. 4 illustrates a smart card with an on-board processor.

While the present invention has been presented above in embodiments in which the logic complexity of processing circuit 212 is rudimentary, in other embodiments processing circuit 212 has much more complexity, including that of a microprocessor. For example, consider the smart card 452 (analogous to the smart card 252 shown in FIG. 2), as depicted in FIG. 4. As shown smart card 452 has an internal processor 412, which in one embodiment is powered by a battery 406 and/or an inductive power receiver 414 (i.e., a wireless charger, which receives near-field lectromagnetism and converts it into direct current power). Assuming, therefore, that the smart card 452 is capable of supporting processor 412, then FIG. 4 depicts additional detail of one embodiment in which a security object 408 (analogous to the security object 208 and/or blended data 224 shown in FIG. 2) is able to make a protected application 404 (analogous to the protected object 204 shown in FIG. 2) executable. More specifically, in one embodiment the security object 408 enables the processor 412 to decrypt the protected application 404 inside (and only inside) a processor 412 in the smart card 452, which provides an additional level of security to the smart card 452. For example, assume that protected (e.g., "encrypted") application 404 is moved in its encrypted form from memory 215 within the smart card 452 to an operational memory within the processor 412, such as an L2 cache 416 (e.g., L2 cache 516 shown in FIG. 5 below). When read into the L2 cache 416, the protected application 404 is encrypted, and thus is not executable. However, (still within the processor 412) the protected application 404 is sent to the security object 408, which renders an executable decrypted application 428 that can be executed by a core 504 (e.g., core 504 shown in FIG. 5) of the processor 412. Details of an exemplary core 504 are presented in FIG. 5.

Figure 5:
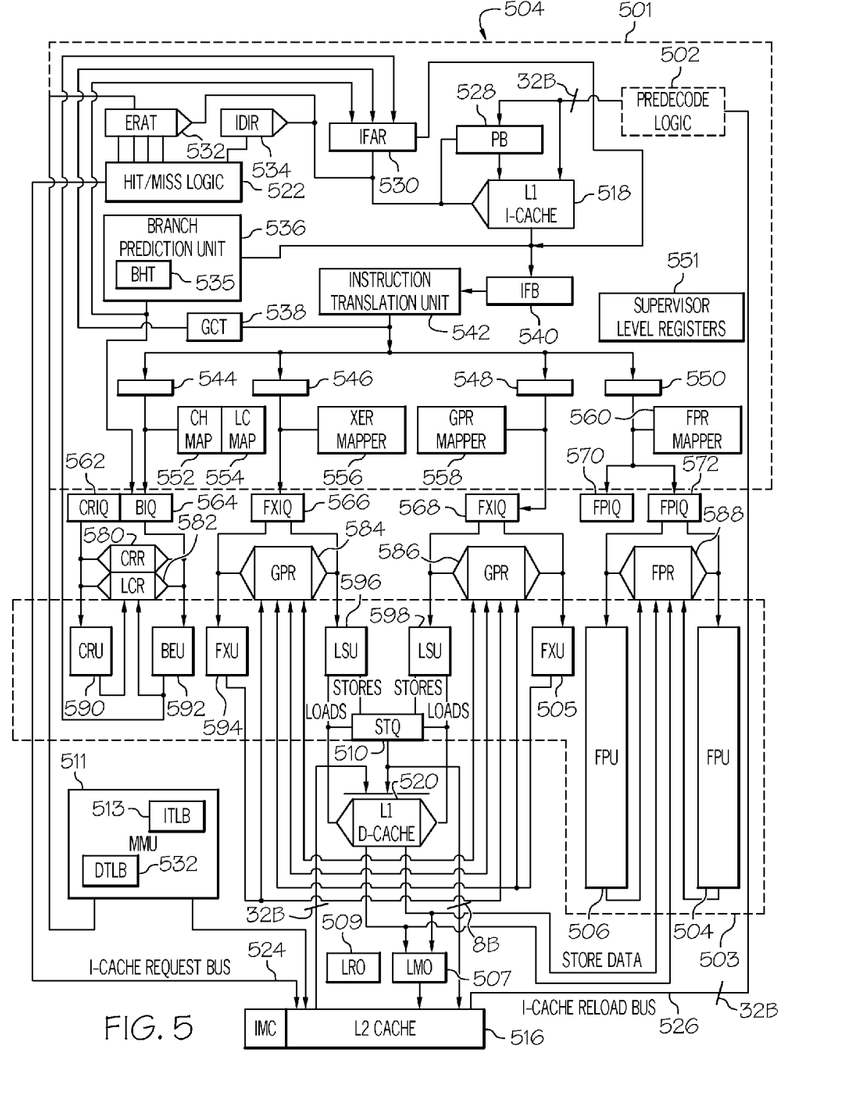
FIG. 5 depicts detail of a core in the on-board processor shown in FIG. 4.

Referring now to FIG. 5, additional exemplary detail of core 504 as depicted in FIG. 4 and FIG. 5 is presented. As shown in FIG. 5, core 504 includes an on-chip multi-level cache hierarchy including a unified level two (L2) cache 516 and bifurcated level one (L1) instruction (I) and data (D) caches 518 and 520, respectively. As is well-known to those skilled in the art, caches 516, 518 and 520 provide low latency access to cache lines corresponding to memory locations in system memories (e.g., system memory 136 shown in FIG. 1).

Instructions are fetched for processing from L1 I-cache 518 in response to the effective address (EA) residing in instruction fetch address register (IFAR) 530. During each cycle, a new instruction fetch address may be loaded into IFAR 530 from one of three sources: branch prediction unit (BPU) 536, which provides speculative target path and sequential addresses resulting from the prediction of conditional branch instructions, global completion table (GCT) 538, which provides flush and interrupt addresses, and branch execution unit (BEU) 592, which provides non-speculative addresses resulting from the resolution of predicted conditional branch instructions. Associated with BPU 536 is a branch history table (BHT) 535, in which are recorded the resolutions of conditional branch instructions to aid in the prediction of future branch instructions.

An effective address (EA), such as the instruction fetch address within IFAR 530, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 504, effective-to-real address translation is performed by memory management units (MMUs) and associated address translation facilities. Preferably, a separate MMU is provided for instruction accesses and data accesses. In FIG. 5, a single MMU 511 is illustrated, for purposes of clarity, showing connections only to Instruction Store Unit (ISU) 501. However, it is understood by those skilled in the art that MMU 511 also preferably includes connections (not shown) to load/store units (LSUs) 596 and 598 and other components necessary for managing memory accesses. MMU 511 includes Data Translation Lookaside Buffer (DTLB) 512 and Instruction Translation Lookaside Buffer (ITLB) 513. Each TLB contains recently referenced page table entries, which are accessed to translate EAs to RAs for data (DTLB 512) or instructions (ITLB 513). Recently referenced EA-to-RA translations from ITLB 513 are cached in EOP effective-to-real address table (ERAT) 532.

If hit/miss logic 522 determines, after translation of the EA contained in IFAR 530 by ERAT 532 and lookup of the real address (RA) in I-cache directory 534, that the cache line of instructions corresponding to the EA in IFAR 530 does not reside in L1 I-cache 518, then hit/miss logic 522 provides the RA to L2 cache 516 as a request address via I-cache request bus 524. Such request addresses may also be generated by prefetch logic within L2 cache 516 based upon recent access patterns. In response to a request address, L2 cache 516 outputs a cache line of instructions, which are loaded into prefetch buffer (PB) 528 and L1 I-cache 518 via I-cache reload bus 526, possibly after passing through optional predecode logic 502.

Once the cache line specified by the EA in IFAR 530 resides in L1 I-cache 518, L1 I-cache 518 outputs the cache line to both branch prediction unit (BPU) 536 and to instruction fetch buffer (IFB) 540. BPU 536 scans the cache line of instructions for branch instructions and predicts the outcome of conditional branch instructions, if any. Following a branch prediction, BPU 536 furnishes a speculative instruction fetch address to IFAR 530, as discussed above, and passes the prediction to branch instruction queue 564 so that the accuracy of the prediction can be determined when the conditional branch instruction is subsequently resolved by branch execution unit 592.

IFB 540 temporarily buffers the cache line of instructions received from L1 I-cache 518 until the cache line of instructions can be translated by instruction translation unit (ITU) 542. In the illustrated embodiment of core 504, ITU 542 translates instructions from user instruction set architecture (UISA) instructions into a possibly different number of internal ISA (IISA) instructions that are directly executable by the execution units of core 504. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 538 to an instruction group, the members of which are permitted to be dispatched and executed out-of-order with respect to one another. Global completion table 538 tracks each instruction group for which execution has yet to be completed by at least one associated EA, which is preferably the EA of the oldest instruction in the instruction group.

Following UISA-to-IISA instruction translation, instructions are dispatched to one of latches 544, 546, 548 and 550, possibly out-of-order, based upon instruction type. That is, branch instructions and other condition register (CR) modifying instructions are dispatched to latch 544, fixed-point and load-store instructions are dispatched to either of latches 546 and 548, and floating-point instructions are dispatched to latch 550. Each instruction requiring a rename register for temporarily storing execution results is then assigned one or more rename registers by the appropriate one of CR mapper 552, link and count (LC) register mapper 554, exception register (XER) mapper 556, general-purpose register (GPR) mapper 558, and floating-point register (FPR) mapper 560.

The dispatched instructions are then temporarily placed in an appropriate one of CR issue queue (CRIQ) 562, branch issue queue (BIQ) 564, fixed-point issue queues (FXIQs) 566 and 568, and floating-point issue queues (FPIQs) 570 and 572. From issue queues 562, 564, 566, 568, 570 and 572, instructions can be issued opportunistically to the execution units of processor 412 (shown in FIG. 4) for execution as long as data dependencies and antidependencies are observed. The instructions, however, are maintained in issue queues 562-572 until execution of the instructions is complete and the result data, if any, are written back, in case any of the instructions need to be reissued.

As illustrated, the execution units of core 504 include a CR unit (CRU) 590 for executing CR-modifying instructions, a branch execution unit (BEU) 592 for executing branch instructions, two fixed-point units (FXUs) 594 and 505 for executing fixed-point instructions, two load-store units (LSUs) 596 and 598 for executing load and store instructions, and two floating-point units (FPUs) 506 and 504 for executing floating-point instructions. Each of execution units 590-504 is preferably implemented as an execution pipeline having a number of pipeline stages.

During execution within one of execution units 590-504, an instruction receives operands, if any, from one or more architected and/or rename registers within a register file coupled to the execution unit. When executing CR-modifying or CR-dependent instructions, CRU 590 and BEU 592 access the CR register file 580, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 582 contains a count register (CTR), a link register (LR) and rename registers of each, by which BEU 592 may also resolve conditional branches to obtain a path address. General-purpose register files (GPRs) 584 and 586, which are synchronized, duplicate register files, and store fixed-point and integer values accessed and produced by FXUs 594 and 505 and LSUs 596 and 598. Note that floating-point register file (FPR) 588, which like GPRs 584 and 586 may also be implemented as duplicate sets of synchronized registers, contains floating-point values that result from the execution of floating-point instructions by FPUs 506 and 504 and floating-point load instructions by LSUs 596 and 598.

After an execution unit finishes execution of an instruction, the execution unit notifies GCT 538, which schedules completion of instructions in program order. To complete an instruction executed by one of CRU 590, FXUs 594 and 505 or FPUs 506 and 504, GCT 538 signals the execution unit, which writes back the result data, if any, from the assigned rename register(s) to one or more architected registers within the appropriate register file. The instruction is then removed from the issue queue and once all instructions within its instruction group have been completed, it is removed from GCT 538. Other types of instructions, however, are completed differently.

When BEU 592 resolves a conditional branch instruction and determines the path address of the execution path that should be taken, the path address is compared against the speculative path address predicted by BPU 536. If the path addresses match, no further processing is required. If, however, the calculated path address does not match the predicted path address, BEU 592 supplies the correct path address to IFAR 530. In either event, the branch instruction can then be removed from BIQ 564, and when all other instructions within the same instruction group have completed executing, from GCT 538.

Following execution of a load instruction, the effective address computed by executing the load instruction is translated to a real address by a data ERAT (not illustrated) and then provided to L1 D-cache 520 as a request address. At this point, the load instruction is removed from FXIQ 566 or 568 and placed in load reorder queue (LRQ) 509 until the indicated load is performed. If the request address misses in L1 D-cache 520, the request address is placed in load miss queue (LMQ) 507, from which the requested data is retrieved from L2 cache 516, and failing that, from another core 504 or from system memory. LRQ 509 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 510 into which effective addresses for stores are loaded following execution of the store instructions. From STQ 510, data can be stored into either or both of L1 D-cache 520 and L2 cache 516.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 504 of FIG. 5, the hard state includes the contents of user-level registers, such as CRR 580, LCR 582, GPRs 584 and 586, FPR 588, as well as supervisor level registers 551. The soft state of core 504 includes both "performance-critical" information, such as the contents of L1 I-cache 518, L1 D-cache 520, address translation information such as DTLB 512 and ITLB 513, and less critical information, such as BHT 535 and all or part of the content of L2 cache 516. Thus, the content of such registers are fixed values that describe a real-time current architecture state register of the processor core 504.

In one embodiment of the present invention, the decoded/decrypted operands from protected application are loaded (sequentially or otherwise) directly into the L1 I-cache 518 depicted in FIG. 5, thus bypassing the IFAR 530, PB 528, predecode logic 502, etc. That is, the security object 208 and/or biometric data 220 create a decrypted application 428, as depicted in FIG. 4. In one embodiment, the decrypted application 428 is sent to the L2 cache 516, depicted in FIG. 5, from which it is dispatched to the predecode logic 502, IFAR 530, etc. However, in one embodiment, the security object 408 (i.e., security object 208 and/or biometric data 220) generates separate operands within the decrypted application 428 (i.e., the security object 408 acts as a compiler), and sends executable operands (i.e., object code derived from the decrypted application 428) directly to the L1 I-cache 518 depicted in FIG. 5).

Returning again to FIG. 2, in one or more embodiments the smart card 252 includes an orientation logic 244, which identifies, in real time, orientation and movement of the smart card 252. That is, orientation logic 244 may include an accelerometer for detecting motion, a gravity detector for detecting positioning (i.e., three-axis orientation), and other hardware for detecting movement and positioning of the smart card 252.

Furthermore, in one embodiment, display 236 shown in FIG. 2 is a touch screen that is divided into a grid structure. In this embodiment, a user touching a particular section of (e.g., quadrant) or all of the display 236 is detectable by the display 236.

Figure 6:
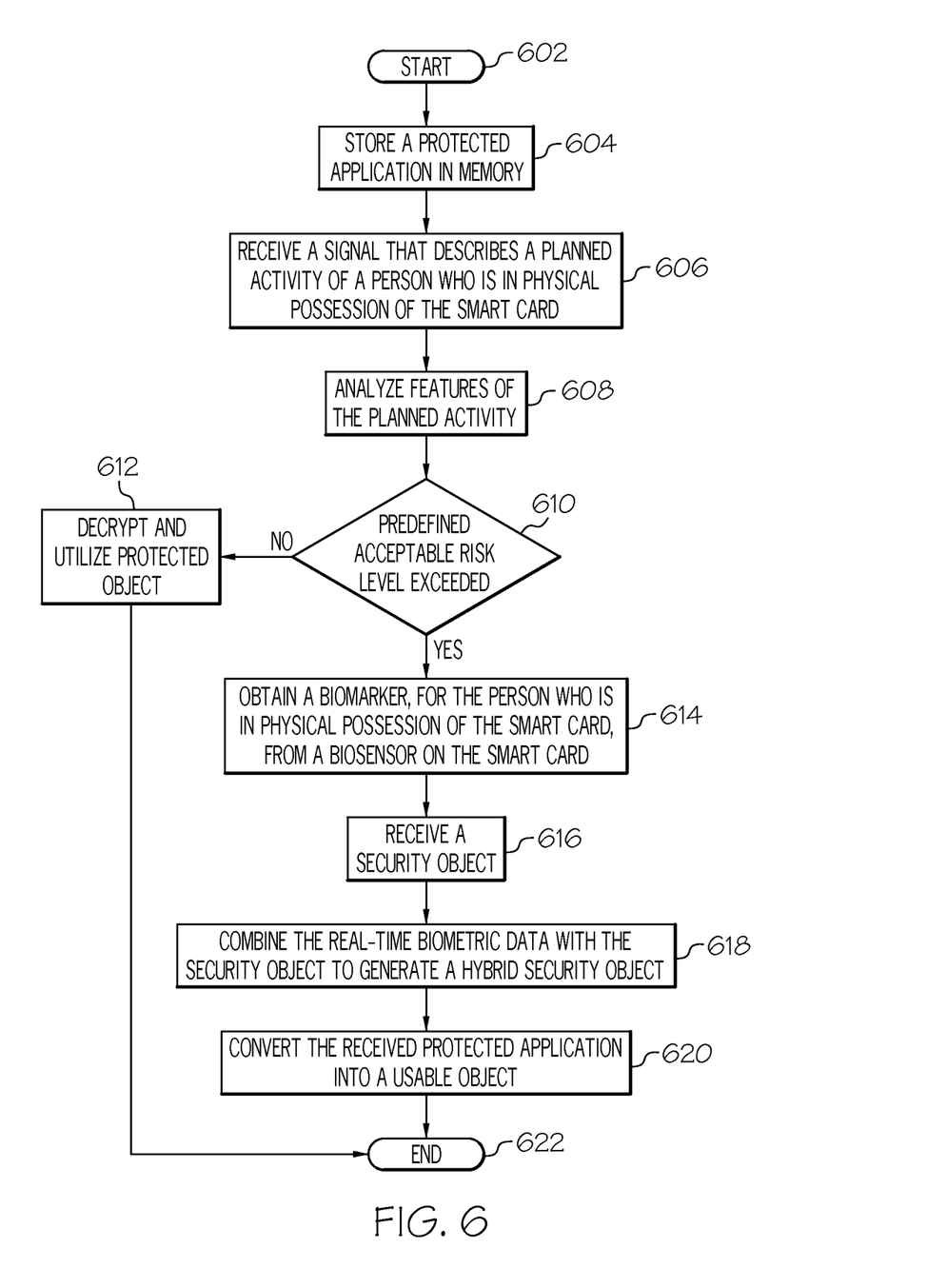
FIG. 6 is a high-level flow chart of exemplary steps taken to securely manage operations within a smart card.

With reference now to FIG. 6, a high-level flow chart of exemplary steps taken to securely manage a smart card is presented. After initiator block 602, a protected object is stored in a memory (block 604). As described herein, the protected object initially cannot be utilized in its protected state by the processing circuit within the smart card.

As described in block 606, an activity detector receives a signal that describes a planned activity of a person who is in physical possession of the smart card. As described in block 608, an activity analyzer analyzes features of the planned activity. As depicted in query block 610, the activity analyzer determining whether or not a predefined risk associated with the planned activity exceeds a predetermined value. If not, then the protected object is simply decrypted or otherwise converted (e.g., with a standard private decryption key) for execution/use (block 612), and the process ends (terminator block 622). However, if the risk level exceeds a predefined acceptable level (query block 610), then the activity analyzer: issues an instruction to the person who is in physical possession of the smart card to provide a biomarker to a biosensor on the smart card; and receives, from the biosensor, real-time biometric data (i.e., a biomarker) for the person who is in physical possession of the smart card (block 614).

As described in block 616, a receiving device receives a security object. This security object is combined, by a blending logic, with the real-time biometric data (biomarker) to generate a hybrid security object (block 618). As described in block 620, a conversion logic, using the hybrid security object, converts the received protected object into a usable object (e.g., executable application, signal controller, etc.) that can be utilized by the processing circuit within the smart card to provide a specific functionality to the smart card 252 shown in FIG. 2. The flowchart ends at terminator block 622.

In one embodiment of the present invention, the biosensor is a camera, and the biomarker is a digital photograph of the person who is in physical possession of the smart card. In this embodiment, the method further comprises storing, in a photo memory, a previous digital photograph of the person who is in physical possession of the smart card, where the previous digital photograph was taken before the biomarker was taken. A comparison logic compares the previous digital photograph and the biomarker. A blocking logic the blocks the conversion logic from creating the usable object in response to the previous digital photograph failing to match the biomarker.

In one embodiment of the present invention, the planned activity with which the smart card will be used is a planned financial transaction. In this embodiment, the method further comprises identifying, by a physical positioning hardware device, a physical location of the smart card in real-time. A financial transaction logic and the activity analyzer are then able to determine that the predefined risk associated with the planned activity exceeds the predetermined value in response to the physical positioning logic determining that the smart card is at a physical location that has been predetermined to be incongruous with the planned financial transaction.

In one embodiment of the present invention, the person who is in physical possession of the smart card is a particular worker, the planned activity is an equipment operation, and the method further comprises identifying, by a worker evaluation logic, an activity that has been preauthorized to be performed by the particular worker. An activity approval logic blocks the conversion logic from creating the hybrid security object in response to the equipment operation failing to match the activity that has been preauthorized to be performed by the particular worker.

In one embodiment of the present invention, the method further comprises executing, in response to the smart card receiving a rescission command, a rescission command to deactivate the security object, wherein deactivating the security object prevents future executions of the protected object.

In one embodiment of the present invention, the protected object is stored in a protected region of memory within the smart card, and the hybrid security object provides access to the protected region of the memory within the smart card. In this embodiment, the method further comprises utilizing, by a memory access hardware logic, the hybrid security object to access the protected object within the protected region of the memory within the mobile device.

In one embodiment of the present invention, the smart card functions as a payment card. In this embodiment, the method further comprises generating, by a matrix barcode generator, a matrix barcode that contains payment information for the person who is in physical possession of the smart card, and displaying, on a display on the smart card, the matrix barcode.

In one embodiment of the present invention, the smart card functions as an identification card. In this embodiment, the method further comprises generating, by a matrix barcode generator, a matrix barcode that contains identification information for the person who is in physical possession of the smart card, and displaying, on a display on the smart card, the matrix barcode.

In one embodiment of the present invention, the smart card functions as a premises access card. In this embodiment, the method further comprises generating, by a matrix barcode generator, a matrix barcode that contains access authorization information for the person who is in physical possession of the smart card, and displaying, on a display on the smart card, the matrix barcode.

Returning again to FIG. 2, in one embodiment of the present invention, the presence of the holder of the smart card 252 is confirmed by physical manipulation detection logic within the smart card 252. For example, assume that the holder of the smart card 252 is attempting to conduct a financial transaction (e.g., make a purchase) over the Internet. A vendor system 246 will request from a customer computer 248 (e.g., one of the other computer(s) shown in FIG. 1) the name of the person making the purchase, as well as the credit card account number. However, a nefarious computer can supply such information automatically (assuming that there has been a successful invasive search of the account). In order to overcome this problem, the present invention utilizes the orientation logic 244 and/or the touchscreen capability of the display 236 shown in FIG. 2 to confirm that the buyer (holder of the smart card 252) is physically present at his computer. For example, the vendor system may direct, over the Internet, the holder of the smart card 252 to physically manipulate the smart card 252 in a certain way. If the user does so, then the display 236 will display a security code or other information that the vendor system 246 requires (and has a copy of for comparison) to complete the transaction, which the buyer will then enter from his customer computer 248. The physical manipulation of the smart card 252 may be to shake the smart card 252 a certain number of times, turn it over a certain number of times, hold it upside down for a certain length of time, press on the display 236 in a certain quadrant, etc., which will be detected by the orientation logic 244, display 236, and other physical sensors embedded in the smart card 252. All of these acts require a person to physically manipulate the smart card 252, thus ensuring that the account data is not simply being sent by a computer or person who has stolen the information from the smart card 252, but rather is being sent from a person who is currently in possession of the smart card 252 itself.

In a further embodiment of the present invention, the requisite physical manipulation of the smart card 252 is known only to the authorized holder of the smart card 252. For example, when setting up the smart card 252, the vendor system 246 receives from the customer computer 248 an input indicating that the "secret manipulation" that the authorized holder will perform is to touch the upper right quadrant of the display 236 (or the smart card 252 itself, assuming that there is a touch grid across the smart card 252) while holding the smart card 252 upside down. When the vendor system 246 wants to complete a purchase transaction with the customer computer 248, rather than telling the card holder how to physically manipulate the smart card 248, the vendor system 246 will simply direct the card holder to handle the smart card 252 according to that user's "secret manipulation" protocol (e.g., holding the card upside down while touching the right upper quadrant of the display/card). This "secret manipulation" is known to only the authorized holder of the smart card 252, thus providing an additional level of security to the smart card 252. Note further that protocol/steps for this "secret manipulation", which is created by the authorized holder, provides additional accessibility, since the "secret manipulation" involves only actions that the authorized holder is physically able to perform.

In one embodiment, rather than the card holder telling the vendor system 246 in words how the "secret manipulation" will be performed during setup, the authorized card holder will perform the "secret manipulation" for the first time during the setup of the card. The orientation logic 244 and/or display 236 and/or touch detection grid (not depicted) across the smart card 252 will detect the physical manipulations to the smart card 252 that are associated with this "secret manipulation", and then send signals to the customer computer 248 and/or the vendor system 246 (e.g., via a near field communication network transceiver—not shown), for storage therein, that are generated by these setup physical manipulations of the smart card 252.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:
1. A smart card comprising:
a processing circuit;
a memory, wherein the memory contains a protected object, wherein the protected object initially cannot be utilized in its protected state by the processing circuit within the smart card;
an activity detector, wherein the activity detector receives a signal that describes a planned activity of a person who is in physical possession of the smart card;
an activity analyzer, wherein the activity analyzer evaluates features of the planned activity, and wherein, in response to the activity analyzer determining that a predefined risk associated with the planned activity exceeds a predetermined value, the activity analyzer:
issues an instruction to the person who is in physical possession of the smart card to provide a biomarker to a biosensor that is physically contained within the smart card; and
receives, from the biosensor, real-time biometric data for the person who is in physical possession of the smart card; a receiving device, wherein the receiving device receives a security object;
a blending logic, wherein the blending logic combines the real-time biometric data with the security object to generate a hybrid security object;
a conversion logic, wherein the conversion logic uses the hybrid security object to convert the received protected object into a usable object that can be utilized by the processing circuit within the smart card;
a matrix barcode generator, wherein the matrix barcode generator generates a matrix barcode that contains payment information for the person who is in physical possession of the smart card; and
a display, wherein the display displays the matrix barcode on the smart card, wherein the smart card functions as a payment card.

* * * * *